(12) United States Patent
Pietraszkiewicz et al.

(10) Patent No.: US 7,866,947 B2
(45) Date of Patent: Jan. 11, 2011

(54) TURBINE BLADE TRIP STRIP ORIENTATION

(75) Inventors: Edward F. Pietraszkiewicz, Southington, CT (US); James P. Downs, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 1044 days.

(21) Appl. No.: 11/648,929

(22) Filed: Jan. 3, 2007

(65) Prior Publication Data

US 2008/0159874 A1 Jul. 3, 2008

(51) Int. Cl.
*F01D 5/18* (2006.01)
*F01D 25/12* (2006.01)

(52) U.S. Cl. .................................. 416/96 R
(58) Field of Classification Search ............... 415/115; 416/96 R, 97 R
See application file for complete search history.

(56) References Cited

U.S. PATENT DOCUMENTS

| 4,257,737 | A | | 3/1981 | Andress | |
|---|---|---|---|---|---|
| 4,416,585 | A | * | 11/1983 | Abdel-Messeh | 416/97 R |
| 4,627,480 | A | * | 12/1986 | Lee | 164/369 |
| 5,052,889 | A | * | 10/1991 | Abdel-Messeh | 416/97 R |
| 5,695,320 | A | * | 12/1997 | Kercher | 416/97 R |
| 5,857,837 | A | | 1/1999 | Zelesky | |
| 6,227,804 | B1 | * | 5/2001 | Koga et al. | 416/96 R |
| 7,094,031 | B2 | | 8/2006 | Lee | |
| 7,163,373 | B2 | * | 1/2007 | Liang | 416/97 R |
| 7,513,745 | B2 | * | 4/2009 | Abdel-Messeh et al. | 416/96 R |
| 2004/0096313 | A1 | * | 5/2004 | Harvey et al. | 415/115 |
| 2005/0265844 | A1 | * | 12/2005 | Levine et al. | 416/97 R |

* cited by examiner

*Primary Examiner*—Nathaniel Wiehe
(74) *Attorney, Agent, or Firm*—Carlson, Gaskey & Olds, P.C.

(57) ABSTRACT

A turbine component includes a coolant passage and a plurality of trip members that extend within the coolant passage. Each of the plurality of trip members includes an orientation relative to an expected flow direction through the coolant passage. At least three of the trip members have orientations that are different from each other. For example, the orientations of the trip members progressively transition along the length of the coolant passage.

17 Claims, 3 Drawing Sheets

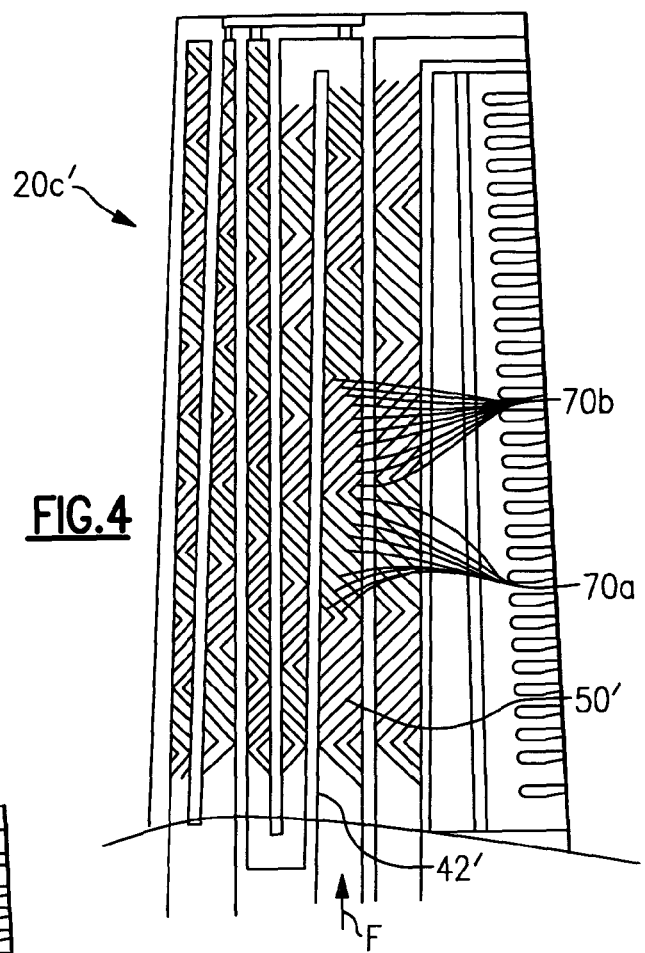
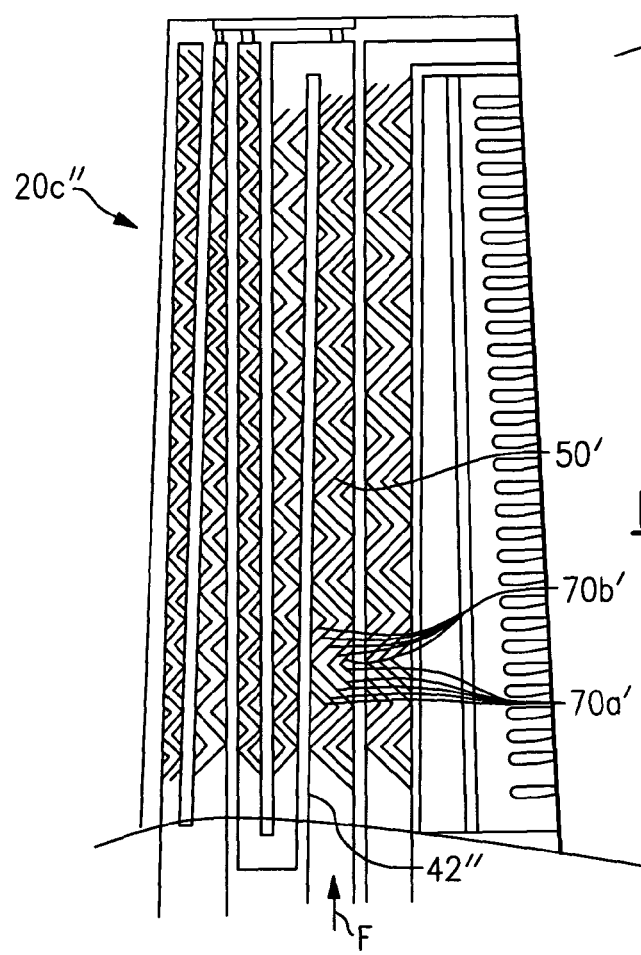

TURBINE BLADE TRIP STRIP ORIENTATION

BACKGROUND OF THE INVENTION

This invention relates to a gas turbine engine component and, more particularly, to components having an internal cooling passage with trip strips that vary in orientation along a length of the cooling passage.

A variety of different machines, such as gas turbine engines, typically include components that operate under elevated temperatures. To resist the elevated temperatures, the components traditionally employ a cooling system. For example, relatively cool air is taken from air flow through the engine and conveyed through internal cooling passages of a turbine blade within the engine. Depending on the particular design of the turbine blade, the cooling passages may include a series of trip strips to promote turbulence, which in turn enhances heat transfer within the cooling passage.

Although effective, there are opportunities in several aspects to improve typical cooling systems that utilize trip strips. For example, the arrangement of the trip strips is typically uniform throughout the passages to promote uniform cooling and heat transfer. However, depending on the turbine blade design, the need for heat transfer may not be uniform because of the difference in sizes of the passages and differences in hot gas flow over outer surfaces of the turbine blade adjacent the passages. Also, the trip strips obstruct air flow through the passages, which results in a pressure drop through the cooling passages that contributes to engine inefficiency by requiring a larger mass flow of input air for cooling.

Therefore, what is needed is an arrangement of trip strips for enhanced heat transfer and less air flow obstruction. This invention addresses these needs while avoiding the shortcomings and drawbacks of the prior art.

SUMMARY OF THE INVENTION

An example turbine component includes a coolant passage and trip members (e.g. trip strips) that extend within the coolant passage. Each of the trip members includes an orientation relative to an expected flow direction through the coolant passage. At least three of the trip members have orientations that are different than one another. For example, the orientations of the trip members progressively transition along a length of the coolant passage over a selected angular range to provide enhanced heat transfer in the coolant passage.

Another example turbine component includes a coolant passage having a turn. A first trip member immediately before the turn has a first orientation and a second trip member immediately after the turn has a second orientation that is different than the first orientation. In one example, such an arrangement reduces pressure drop due to reduced resistance of flow through the turn.

In another example turbine component includes a coolant passage and first trip members that are consecutively spaced apart within the coolant passage. The first trip members include a first orientation. Second trip members are also consecutively spaced apart within the coolant passage and have a second orientation that is different than the first orientation. In one example, the arrangement of the first trip members and the second trip members forms a "zigzag" pattern.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 4 illustrates another embodiment of the turbine blade having a different arrangement of trip strips within the passages.

FIG. 5 illustrates another embodiment of the turbine having a different arrangement of the trip strips within the passages.

DETAILED DESCRIPTION OF THE PREFERRED EMBODIMENT

Figure 1:
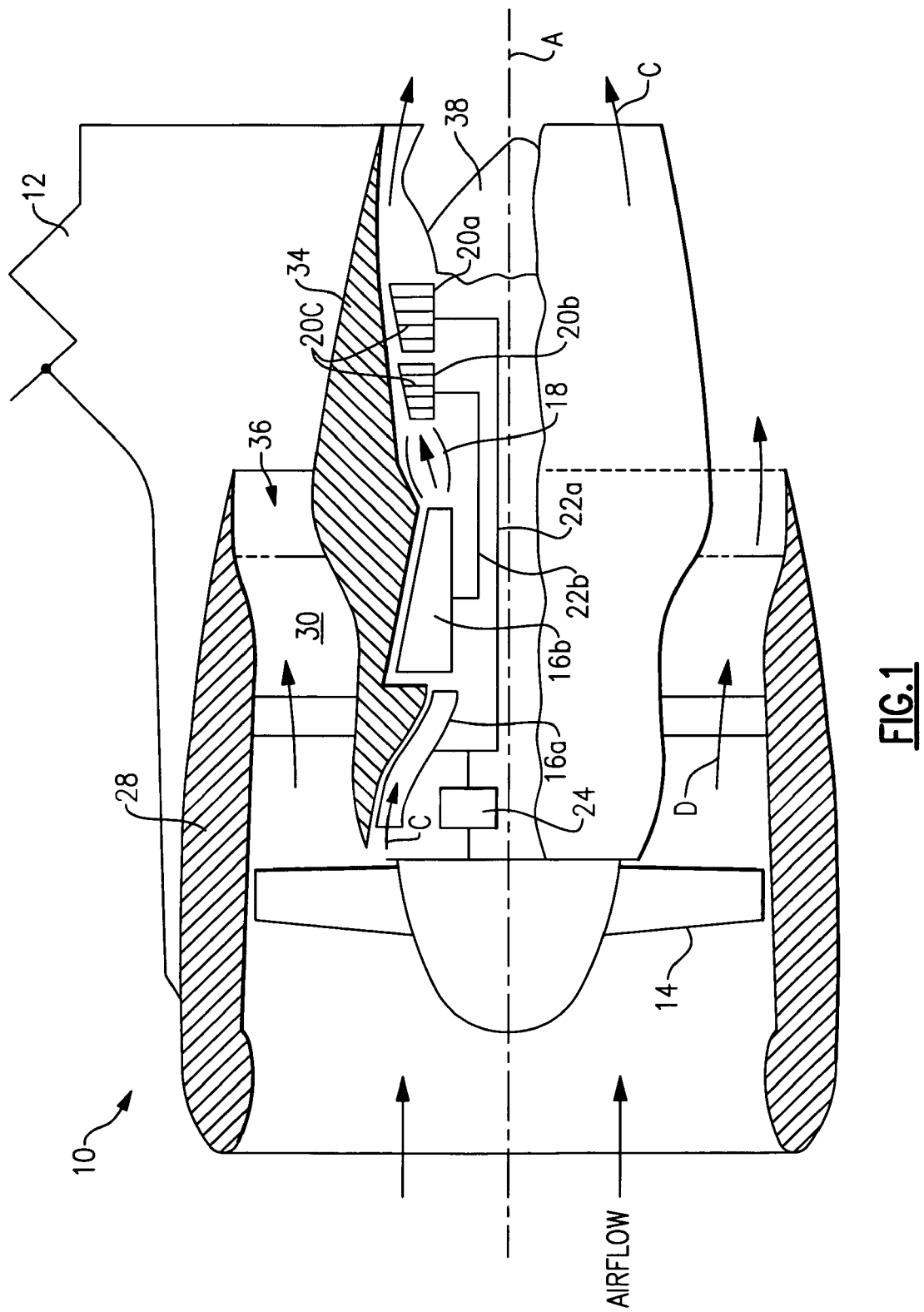
FIG. 1 illustrates selected portions of an example gas turbine engine.

FIG. 1 illustrates a schematic view of selected portions of an example gas turbine engine 10 suspended from an engine pylon 12 of an aircraft. The gas turbine engine 10 is circumferentially disposed about an engine center line axis A and includes a fan 14, a low pressure compressor 16a, a high pressure compressor 16b, a combustion section 18, a low pressure turbine 20a, and a high pressure turbine 20b. As is known, pressurized air from the compressors 16a, 16b is mixed with fuel and burned in the combustion section 18 for expansion in the turbines 20a, 20b. The turbines 20a, 20b are coupled for rotation with, respectively, rotors 22a and 22b (e.g., spools) to rotationally drive the compressors 16a, 16b and the fan 14 in response to the expansion of gases over turbine blades 20c of the turbines 20a and 20b. In this example, the rotor 22a drives the fan 14 through a gear 24, such as a planetary gear arrangement or other gear system.

An outer housing, nacelle 28 (also commonly referred to as a fan nacelle), extends circumferentially about the fan 14. A generally annular fan bypass passage 30 extends between the nacelle 28 and an inner housing, inner cowl 34, which generally surrounds the compressors 16a, 16b and turbines 20a, 20b. Although this example shows a specific engine arrangement, it is to be understood that other types of machines, engines or engine arrangements are contemplated.

In operation, the fan 14 draws air into the gas turbine engine 10 as a core flow C and into the bypass passage 30 as a bypass airflow D. An exhaust 36 discharges the bypass airflow D from the gas turbine engine 10 to provide thrust. The core flow C is discharged from a passage between inner cowl 34 and a tail cone 38.

Figure 2:
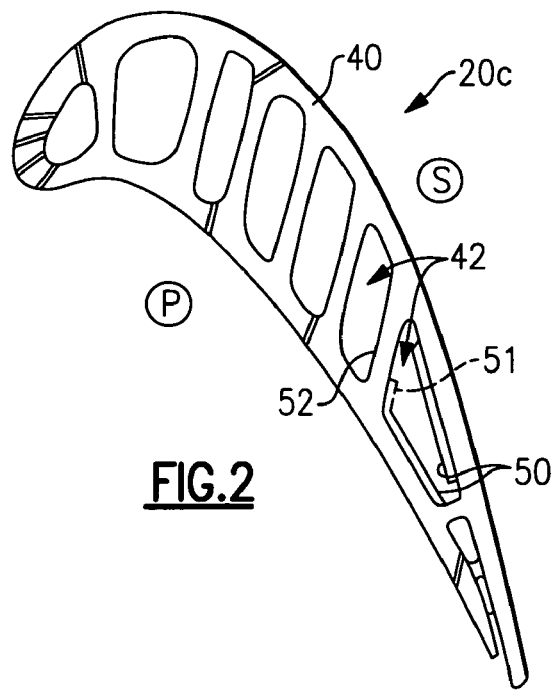
FIG. 2 illustrates a cross-sectional view of an example turbine blade.

FIG. 2 illustrates one example of a cross-section of the turbine blade 20c. In this example, the turbine blade 20c includes walls 40 that generally form an airfoil shape of the turbine blade 20c. The turbine blade 20c is formed with one or more internal passages 42 that generally extend from a base 44 to a tip 46 (FIG. 3) of the turbine blade 20c. In the disclosed example, relatively cool air taken from the compressors 16a, 16b, the bypass passage 30, or other source is fed through the passages 42 to maintain the turbine blade 20c below a certain temperature.

In the disclosed example, one or more of the passages 42 include trip strips (i.e. trip members) 50 that protrude from the walls 40 of the turbine blade 20c into the passages 42. The trip strips 50 promote turbulence of the cooling air flowing through the passages 42, which increases heat transfer. Optionally, the trip strips 50 may include a section 51 (shown in phantom) that extends from a rib 52 that defines the passage 42 to induce a "cork screw" flow pattern. In one example, the trip strips 50 extend from alternating sides of the passage 42, such as between a suction side and a pressure side of the turbine blade 20c.

Figure 3:
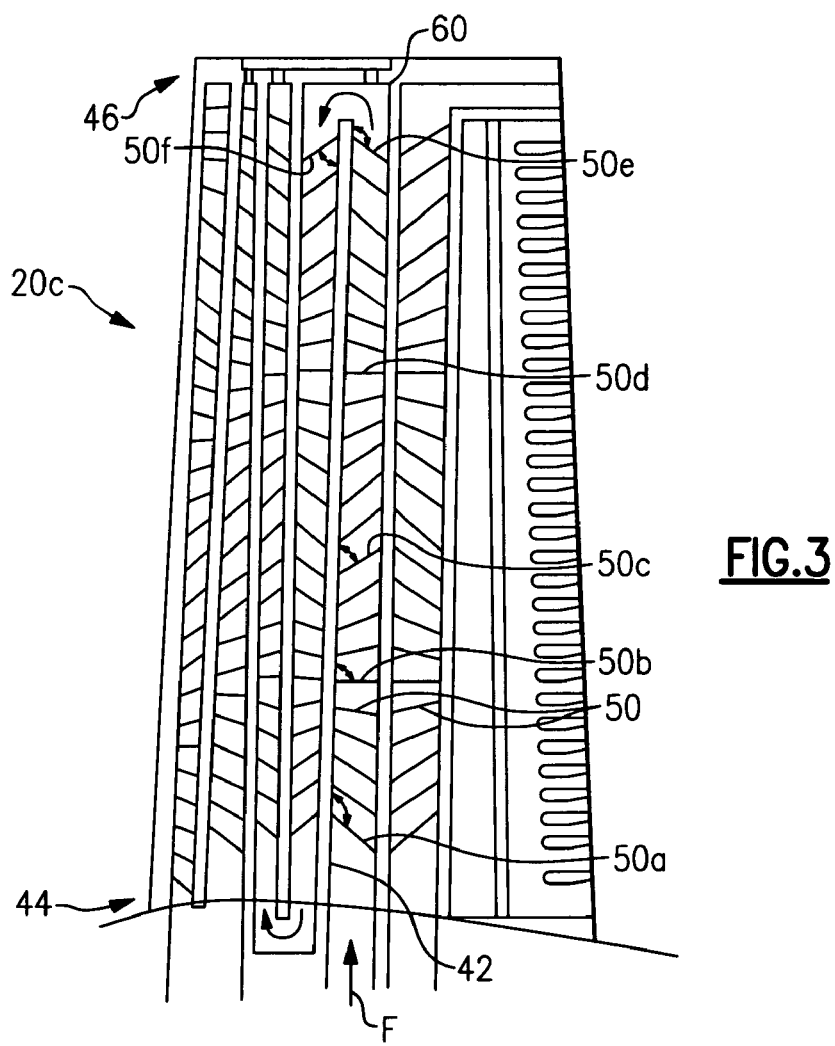
FIG. 3 illustrates an example arrangement of trip strips within passages of a turbine blade.

FIG. 3 is a schematic view of a longitudinal cross-section of the turbine blade 20c and illustrates an arrangement of the trip strips 50 along various passages 42. The arrangement will be described with reference to orientations of the trip strips 50 relative to an expected flow F of the cooling air through the passages 42. For example, a reference system is established such that the orientations of the trip strips 50 are described as angles relative to an axis located along the left side of the passages 42 relative to the direction of the flow F. Although a certain reference system is described herein, it is to be understood that other reference systems may be used to describe the orientation.

In the disclosed example, the orientations of the trip strips 50 within passage 42 transition along the length of the passage 42. For example, three of the trip strips 50 have different orientations. Using differently oriented trip strips 50 permits enhancement of heat transfer over the length of the passage 42. For example, there is more heat transfer at a leading edge of any particular trip strip 50 (i.e., the edge that first receives the flow F) compared to a trailing edge of the trip strip 50. Thus, by selecting different orientations of the trip strips 50 during a design stage, one can locate the leading edges in portions of the turbine blade 20c that require more cooling.

In one example, the orientations of the trip strips 50 progressively transition along the passage 42. For example, trip strip 50a near the beginning of the passage 42 has an orientation of 135°. Trip strip 50b farther along the passage 42 has an orientation of 90°. As understood, the angles may be different if a different reference system is selected. In this example, there are several other trip strips 50 between trip strips 50a and 50b having orientations that progressively transition between 135° and 90°.

Moving farther along the passage 42, trip strip 50c has an orientation of 45°, trip strip 50d has an orientation of 90°, and trip strip 50e has an orientation of 135°. As can be appreciated, the orientations of trip strips 50, 50a-e progressively transition from 135° to 90° to 45° to 90° and again to 135°. In this example, the trip strips 50, 50a-e transition back to the 135° at trip strip 50e immediately before a turn section 60 of the passage 42 to reduce pressure drop of the flow F through the turn section 60. The first trip strip 50f immediately after the turn section 60 has an orientation different from the orientation of trip strip 50e immediately before the turn section 60. In the illustrated example, the orientation of the trip strip 50f is 45°. The different orientations provide the benefit of reducing, and in some cases minimizing, resistance to the flow F through the turn section 60.

Although trip strips 50e and 50f are shown with particular orientation, it is to be understood that the trip strips 50e and 50f could have different orientations than shown in this example, depending on the design of the passages 42 and turbine blade 20c. In one example, the pressure drop through the turn section 60 is predicted using computer simulation to select a desirable combination of different orientations for the trip strips 50e and 50f.

In one example, passages 42 having relatively long spans or relatively wide widths compared to other passages 42 in the turbine blade 20c or as defined in the industry are particularly suited for trip strips 50 having different orientations. For example, there is a variation in cooling requirements along the larger passage 42 due to a comparatively larger amount of hot gas flow over the outer surfaces corresponding to the larger passage 42 compared to smaller passages 42. Thus, the different orientations of the trip strips 50 provide the benefit of tailoring the heat transfer to achieve more uniform cooling in the larger passage 42. Relatively smaller passages 42 may likewise benefit.

FIG. 4 illustrates another example turbine blade 20c'. In this example, the trip strips 50' are arranged in a "zigzag" pattern. In the disclosed example, the "zigzag" pattern is formed using a plurality of first trip strips 70a and a plurality of second trip strips 70b. The plurality of first trip strips 70a all have an orientation of 135° in this example, and the plurality of second trip strips 70b all have an orientation of 45° in this example. In the disclosed example, there are ten first trip strips 70a and ten second trip strips 70b that are relatively tightly spaced together. It is to be understood that greater numbers of trip strips 70a, 70b may alternatively be used. The spacing between the trip strips 50', 70a, 70b can depend on a variety of different factors, such as the length of the passage 42', the width of the passage 42' or other design parameters.

Referring to FIG. 5, example turbine blade 20c" is similar to the example turbine blade 20c' shown in FIG. 4, except that the plurality of first trip strips 70a' and the plurality of second trip strips 70b' are spaced farther apart. In this example, there are five first trip strips 70a' and five second trip strips 70b'. In other examples or other passages 42", more or fewer trip strips 50' are included in the sets of trip strips 70a', 70b', depending upon the length and width of the passage 42", for example.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine component comprising:
   a coolant passage;
   a plurality of trip members that extend within the coolant passage, each of the plurality of trip members having an orientation relative to an expected flow direction through the coolant passage, three of the plurality of trip members having different orientations; and
   wherein the orientations of the plurality of trip members progressively transition along a length of the coolant passage over a selected angular range.

2. The turbine component as recited in claim 1, wherein the respective orientations of the three trip members are X°, Y°, and Z°, wherein X, Y, and Z have different values.

3. The turbine component as recited in claim 1, wherein the orientations of the three trip members comprise 45°, 90°, and 135°.

4. The turbine component as recited in claim 1, wherein the orientations of the plurality of trip members progressively transition along a length of the coolant passage over a selected angular range between 45° and 135°.

5. The turbine component as recited in claim 1, wherein the orientations of the plurality of trip members progressively transition along the length of the coolant passage from a first orientation toward a second, different orientation and then from the second orientation toward the first orientation.

6. The turbine component as recited in claim 1, wherein the orientations of the plurality of trip members progressively transition along the length of the coolant passage from 135° to 90° to 45° to 90° to 135°.

7. The turbine component as recited in claim 1, wherein the coolant passage includes a turn, and wherein the orientation of a last trip member before the turn is different from the orientation of a first trip member after the turn.

8. The turbine component as recited in claim 1, further comprising a suction side wall, a pressure side wall, and ribs that extend between the walls to define the coolant passage, and wherein the plurality of trip members alternately protrude from the suction side wall and the pressure side wall.

9. The turbine component as recited in claim 8, wherein at least a portion of the plurality of trip members also protrude from at least one of the ribs.

10. The turbine component as recited in claim 1, further comprising a gas turbine engine having a compressor and a combustor downstream of the compressor, wherein the turbine component comprises a turbine blade that is located downstream from the combustor.

11. The turbine component as recited in claim 1, wherein each of said plurality of trip members comprise a base end connected to a passage wall and a free distal end protruding into said passage.

12. A turbine component comprising:
a coolant passage having a turn;
a first trip member immediately before the turn relative to an expected flow direction through the turn, the first trip member having a first orientation relative to the expected flow direction;
a second trip member immediately after the turn relative to the expected flow direction through the turn, the second trip member having a second orientation relative to the expected flow direction that is different than the first orientation; and
wherein the coolant passage includes a section that is adjacent the turn, the section having a plurality of trip members each having an orientation relative to the expected flow direction, the orientations progressively transitioning along a length of the section.

13. The turbine component as recited in claim 12, wherein the orientation of the first trip member is 135° relative to the expected flow direction along a radially inward axis of the turn and the orientation of the second trip member is 45° relative to the expected flow direction along a radially inward axis of the turn.

14. The turbine component as recited in claim 12, wherein three of the plurality of trip members have different orientations.

15. A turbine component comprising
a coolant passage comprising a first transition region;
a plurality of trip members that extend within the coolant passage, each of the plurality of trip members having an orientation relative to an expected flow direction through the coolant passage, three of the plurality of trip members having different orientations, each of said three of the plurality of rip members being consecutively spaced along a coolant passage wall; and
wherein the orientation of each of said plurality of trip members progressively transitions from 45° at a first end of said first transition region to 90° at a second end of said first transition region.

16. The turbine component as recited in claim 15, further comprising a second transition region in said coolant passage, wherein the orientation of each of said plurality of trip members progressively transitions from 90° at a first end of said second transition region to 135° at a second end of said second transition region.

17. The turbine component as recited in claim 16, wherein said first end of said second transition region is said second end of said first transition region.

* * * * *